Figure 1:
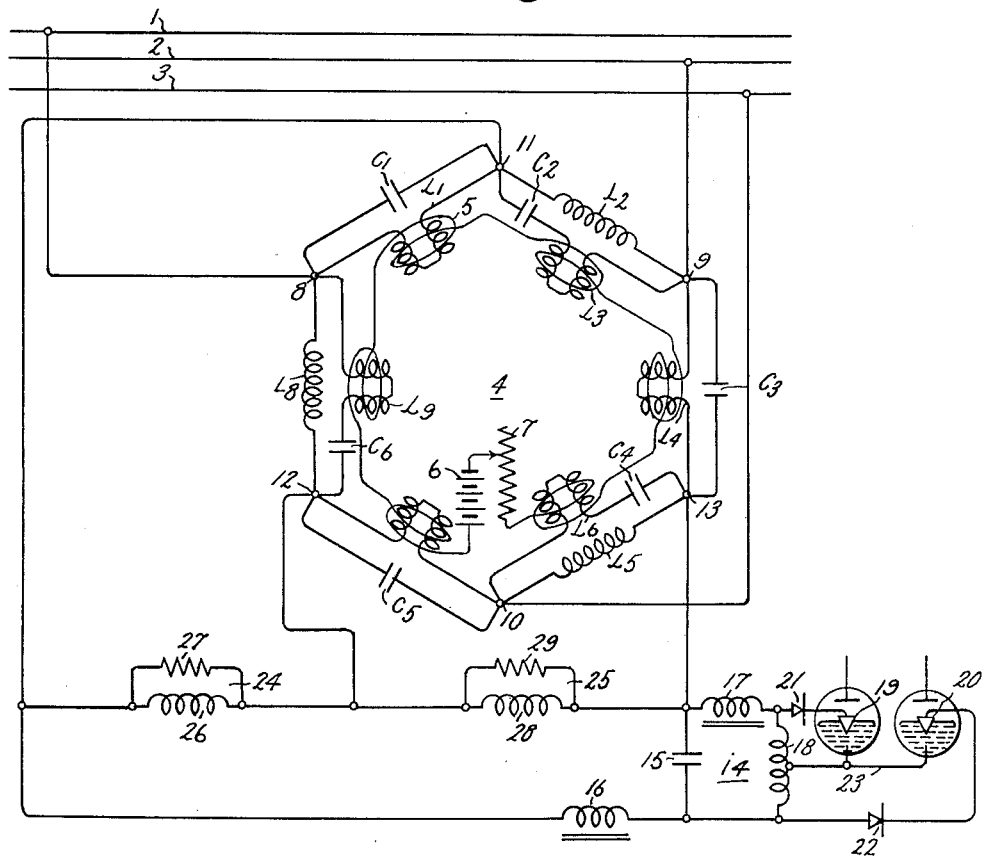

April 7, 1953  B. D. BEDFORD ET AL  2,634,397
PHASE SHIFTING NETWORK
Filed May 31, 1952

Inventors:
Burnice D. Bedford,
Harry L. Kellogg,
by Prowell S. Mack
Their Attorney Patented Apr. 7, 1953

2,634,397

UNITED STATES PATENT OFFICE 2,634,397

PHASE SHIFTING NETWORK

Burnice D. Bedford and Harry L. Kellogg, Scotia, N. Y., assignors to General Electric Company, a corporation of New York Application May 31, 1952, Serial No. 290,944

4 Claims. (Cl. 323—124)

This invention relates to phase shifting networks, and more particularly, to static impedance phase shifting networks utilizing a combination of fixed and variable reactance elements for effecting a variation in phase relation between an output voltage of the network relative to an input voltage thereof.

The term "input angle" is used throughout the specification to denote the angle between two of the power supply voltage vectors applied to any given pair of phase shifting elements of the network. For ease in distinguishing between an inductive reactance and a capacitive reactance, the capacitive reactance is referred to at times as being of opposite sign from that of an inductive reactance. In like manner, the distinction between a lagging power factor and a leading power factor will be made at times by referring to a power factor of opposite sign when comparison of a leading power factor is made to a lagging power factor.

An important use of phase shifting networks has been in connection with tube rectifiers and inverters, in order to effect a shift in phase of the voltage applied to a control electrode of the rectifier or inverter tubes relative to the anode voltage, and thereby to control the operation of such rectifiers and inverters. In application Serial No. 84,208, by John C. Price, filed March 29, 1949, now Patent Number 2,598,432, and assigned to the assignee of this invention, a phase shifting arrangement is disclosed wherein a fixed inductive reactance and a variable inductive reactance are connected in series relation across components of input voltage having various phase relations which are referred to as the "input angle" and wherein an output voltage is taken from the network between a junction point of the reactive elements and a neutral or other displaced output terminal of the network for energizing the load circuit, the voltage of which is to be shifted in phase relative to the input voltage. This Price application also contemplates an arrangement wherein the fixed reactive element may be capacitive and wherein the variable reactive element may be capacitive. The arrangement disclosed in the Price application is capable of producing a substantially constant output voltage with very low losses in the phase shifting network, but the magnitude of maximum phase shift obtainable with the arrangement disclosed in this Price application is limited to an angle of shift which is twice the input angle of voltage supplied to the network, and the fixed and variable reactance elements are of the same sign, i. e., both elements are either inductive or both elements are capacitive.

In application Serial No. 235,343, by Burnice D. Bedford, filed July 3, 1951, now Patent Number 2,598,437, and assigned to the assignee of this invention, a phase shifting network of the type disclosed in the above-mentioned Price application is described wherein a fixed reactance element is connected in series with a variable reactance element. In this Bedford application, the variable reactance element is controlled in such a way that its reactance can be varied from a large value of inductive reactance to zero and to a large value of capacitive reactance, or vice versa, and the maximum angle of shift is substantially greater than that obtainable with the invention of the above-mentioned Price application. Thus, with the invention of the Bedford application, the variable reactance element may be of the same sign as the fixed reactance element for certain magnitudes of phase shift, and for different magnitudes of phase shift the variable reactance element will be of the opposite sign from the fixed reactance element.

With the above-mentioned Price and Bedford applications, it is possible to achieve a substantially constant output voltage to the load, to maintain the circuit losses at a low value, and to achieve angles of shift up to twice the input angle using the Price invention, and up to almost 360 degrees using the Bedford invention. In both the Price and Bedford inventions, the power factor angle of the load circuit energized from the phase shift network must be one-half of the input angle and opposite in sign to the sign of the fixed reactance.

A principal object of this invention is to provide an improved phase shift network which is capable of effecting wide angles of shift without materially changing the load voltage, and which can be used to energize a load whose power factor angle may be any desired value leading or lagging within a range of angles up to one-half the input angle.

According to this invention an inductive branch circuit having a fixed and variable reactance connected in series is connected in parallel with a capacitive branch circuit having a fixed and variable capacitance circuit and these branch circuits are connected across components of input voltage to form a phase shift network. Phase shift of voltage supplied to a load connected between the junction point of the branch circuits and another terminal of the network is accomplished by a common control circuit which regulates the reactance of both the variable elements.

Our invention will be better understood from the following description taken in connection with the accompanying drawing, and its scope will be pointed out in the appended claims.

Figure 2:
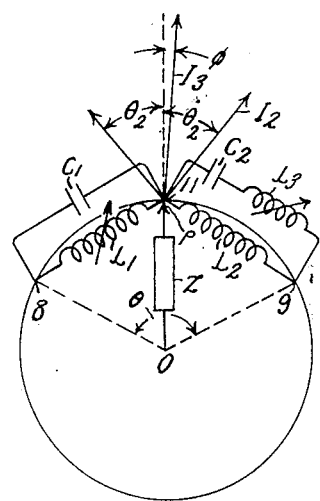
Figure 3:
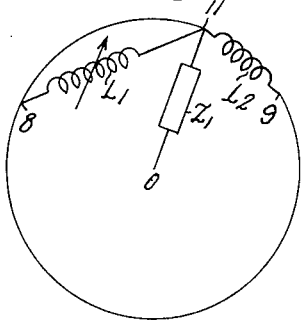
Figure 4:
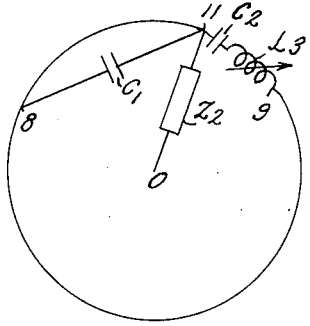

In the drawing, Fig. 1 is a diagrammatic representation of one embodiment of the invention as used with a three-phase circuit; Fig. 2 is a vector diagram to aid in understanding the operation of the arrangement shown in Fig. 1; and Figs. 3 and 4 are schematic circuits representative of different portions of the circuit arrangement shown in Fig. 1.

In Fig. 1 of the drawing, a polyphase network is represented which is particularly useful for rectifier and inverter circuits since it is connected to operate with an input angle of 120 degrees which is directly obtained from a three-phase power supply.

A three-phase alternating current supply circuit is indicated by the conductors 1, 2, and 3, and it is assumed that as in the usual three-phase circuit, there are provided three voltages of equal magnitude which are displaced 120 degrees in time phase.

The phase shifting network 4 comprises low loss reactance elements, some of which are of a fixed value of reactance and others of which are of a variable value of reactance.

The network 4 as shown in Fig. 1 in reality comprises a plurality of branch circuits. For example, interconnected between the conductors 1 and 2 is a first branch circuit comprising a variable inductive reactance $L_1$ and a fixed inductive reactance $L_2$. Also interconnected between conductors 1 and 2 is a second branch circuit comprising the fixed capacitance $C_1$ and the variable reactance including the fixed capacitance $C_2$ and the variable inductance $L_3$. For convenience, the above-mentioned first branch circuit including the variable reactance $L_1$ and the fixed inductive reactance $L_2$ are shown schematically in Fig. 3, while the second above-mentioned branch circuit including the fixed capacitors $C_1$ and $C_2$ and the variable inductor $L_3$ is shown in Fig. 4 for purposes of clarity. For purposes of simplicity, the branch circuit shown in Fig. 3 will be referred to herein as the inductive branch circuit, and the branch circuit of Fig. 4 will be referred to as the capacitive branch circuit, it being understood that these names are derived from the characteristic sign of the fixed element of each branch circuit.

As is indicated in Fig. 1, another pair of branch circuits are interconnected between the conductors 2 and 3. These branch circuits comprise a capacitive branch circuit including the capacitor $C_3$, the capacitor $C_4$, and the variable inductor $L_6$. Also interconnected between conductors 2 and 3 is an inductive branch circuit including a variable inductance $L_4$ and a fixed inductive reactance $L_5$. In like manner, an inductive branch circuit including the fixed inductance $L_8$ and the variable inductance $L_7$ is interconnected between the conductors 1 and 3, while another capacitive branch circuit is also interconnected between conductors 1 and 3 and includes a variable inductor $L_9$ and fixed capacitors $C_5$ and $C_6$.

The variable inductive reactors $L_1$, $L_3$, $L_4$, $L_6$, $L_7$ and $L_9$ as shown in Fig. 1 are controllable in reactance by means of a control winding 5, which is wound about these reactors. As illustrated, each of these elements comprises a pair of saturable reactors inductively coupled with the control winding 5. These variable reactors could comprise a winding wound on an individual core with the control winding 5 magnetically coupled therewith or, if desired, a four-legged core could be used with each of the series windings on a separate leg and with the winding 5 wound on the fourth leg of the core. Control current is supplied to the control winding 5 from a source indicated as the battery 6, and is controlled in magnitude by any suitable means such as by the rheostat 7. The network 4 is provided with a plurality of input terminals 8, 9, and 10, and with a plurality of output terminals 11, 12, and 13. It will be understood that each of the output terminals comprises the junction point between each element or leg of each of the branch circuits. The input terminals 8, 9, and 10 are connected respectively to the phase conductors 1, 2, and 3 so that the input angle of the network is 120 degrees. A load circuit 14 is connected across the output terminals 11 and 13 and, as illustrated, is of a type known as an ignitron firing circuit as described in United States Patent 2,362,294, granted November 7, 1944, upon an application of A. H. Mittag. This circuit typically comprises a firing capacitor 15 connected to be energized through a linear reactor 16 from the output terminals 11 and 13 of the phase shift circuit. The firing capacitor 15 when fully charged discharges through a self-saturating or firing reactor 17 to energize an auto-transformer 18 from which the ignitors 19 and 20 are energized in known manner. The ignitor 19 is arranged to be energized through a rectifier 21 from one end terminal of the transformer 18 and the ignitor 20 is connected to be energized through a rectifier 22 from the opposite terminal of transformer 18. A return conductor 23 is connected between the common cathode terminals of the ignitors and the mid-tap of transformer 18. This circuit, as is well known, has a lagging power factor. The remaining two load circuits 24 and 25 for the application chosen for explanation are intended to represent similar firing circuits of the type indicated by the numeral 14. These load circuits are represented schematically so that the load circuit 24 connected across output terminals 11 and 12 comprises an inductance 26 and a resistance 27, and load circuit 25 connected across output terminals 12 and 13 comprises an inductance 28 and a resistance 29.

In Fig. 2, a so-called inductive branch circuit such as is indicated in Fig. 3, has been combined with a so-called capacitive branch circuit as is indicated in Fig. 4, and in addition vectors representing the currents supplied by each branch circuit are indicated at $I_1$ and $I_2$ while the resultant current $I_3$ is represented also. In Figs. 2–4, the load impedance is represented respectively by the letters Z, $Z_1$, and $Z_2$.

The inductive branch circuit such as is indicated in Fig. 3 and the capacitive branch circuit such as is indicated in Fig. 4 are substantially the same as the corresponding circuits contemplated in the above-mentioned Bedford application. According to the present invention, the two branch circuits of Figs. 3 and 4 are combined as is indicated in Fig. 2 in such a way as to render the power factor angle of the load circuit independent of the input angle, so long as the load power factor angle is not leading by more than one-half the input angle nor lagging by more than one-half the input angle.

A network with a fixed inductance such as the so-called inductive network shown in Fig. 3, is capable of supplying a leading load with a power factor angle one-half of the input angle, while a capacitive network such as the network indicated in Fig. 4, is capable of supplying a lagging load having a power factor angle equal to one-half the input angle. According to the present invention, the two branch circuits such as are shown in Figs. 3 and 4 are proportioned and combined as indicated in Fig. 2 so as to supply a load of any power factor angle within the range between one-half the input angle leading to one-half the input angle lagging.

Indicated in Fig. 2 are the input terminals 8 and 9 between which is connected the capacitors C₁ and C₂ and the variable reactance element L₃ as well as the reactors L₁ and L₂. A load comprising the impedance Z is connected between the junction 11 and point O. Origin point O of Fig. 2 is shown for purposes of explanation and represents the neutral of the three-phase output circuit of Fig. 1 although the circuits of Fig. 1 are mesh-connected and hence do not actually have a neutral point. Of course, the load could be arranged as an equivalent star-connected load instead of the mesh load shown and as a result a neutral such as is represented by origin point O would be established. In Fig. 2 the angle $\theta$ is the input angle and the dotted lines between point O and point 8 and between point O and point 9 represent voltage vectors intersecting at the origin O to define the input angle $\theta$ for the branch circuits such as are shown in Figs. 3 and 4.

In Fig. 2, the current vector I₁ illustrates the component of current supplied to the load by the branch circuit comprising the inductive reactances L₁ and L₂. This current leads the output voltage OP by an angle equal to one-half the input angle and indicated as $$\frac{\theta}{2}$$

in Fig. 2. In Fig. 2, the vector I₂ represents the current supplied to the load by the branch circuit including the capacitor C₁, the capacitor C₂, and the variable inductive reactance L₃. This current lags the output voltage OP by an angle which is one-half of the input angle and which, in Fig. 2, is represented by the designation $$\frac{\theta}{2}$$

In Fig. 2, the vector sum of the currents I₁ and I₂ is represented by the vector I₃. Assuming a counterclockwise rotation of vectors about the point P, the vector I₃ is shown lagging by a small angle $\phi$ since I₂ is shown larger than I₁. It will be understood that by proper proportioning of the components comprising the two branch networks, i. e., the inductive and the capacitive branch circuits, a load having any power factor angle leading or lagging could be supplied with energy so long as the power factor angle does not exceed one-half the input angle lagging or leading. Thus, by this invention, wide angles of shift can be achieved as in the above-mentioned Bedford and Price applications without causing variations in the voltage supplied to the load and with relatively low losses in the circuit, and the power factor angle of the load is independent of the input angle up to values of power factor angle equal to one-half the input angle, both leading and lagging, provided the proper components for the phase shift circuit are used.

When the capacitors C₁ and C₂ of the capacitive branch circuit indicated in Fig. 4 have values of reactance which are equal, the reactance of reactor L₃ has the same relation to the current I₂ as the variable reactor L₁ of the inductive branch circuit has to the current I₁. By so proportioning the components, it is possible to control the variable inductive reactor L₁ and the variable inductive reactor L₃ with a common control signal supplied through a winding, such as the winding 5 shown in Fig. 1, and in this way to obtain a substantially constant output voltage which is controllable in phase position relative to the input voltage.

While the above discussion has centered around the capacitive branch circuit indicated in Fig. 4 and the inductive branch circuit indicated in Fig. 3, which are interconnected between the input terminals 8 and 9, it will be understood that the capacitive and inductive branch circuits which are interconnected between the input terminals 9 and 10 and similar circuits which are interconnected between input terminals 8 and 10 are identical in nature.

With reference to Fig. 2, when the values of reactance of reactor L₁ and of reactor L₃ are substantially zero, the load voltage OP will occupy the position OM. When L₁ and L₂ are equal in values of reactance, and when L₃ and C₂ are equal, the load voltage occupies the position ON. When L₁ and L₃ are infinite, the load voltage occupies the position OP'. When L₃ is equal to one-half C₂ in reactance, and when L₁ is equal to one-half of L₂ in reactance, the load voltage OP will lie in the vertical position, as is indicated at OP in Fig. 2. Furthermore, the voltage, current, and reactance of L₁ are all equal to the corresponding quantities for L₃, when the load power factor is unity, and these quantities are proportional for power factors other than unity of the load. If the reactance of C₁ is equal to the reactance of L₂, the circuit will be conditioned to supply a unity power factor load. If the capacitor C₁ is one-half the value of the fixed reactor L₁ in reactance, then the power factor of the load is 30 degrees or one-fourth of the input angle of 120 degrees.

While we have shown and described particular embodiments of the invention, it will be obvious to those skilled in the art that various changes and modifications may be made without departing from the invention, and it is, therefore, intended in the appended claims to cover all such changes and modifications as fall within the true spirit and scope of the invention.

What we claim as new and desire to secure by Letters Patent of the United States is:

1. An impedance phase shifting network comprising fixed inductive reactive means and variable inductive reactive means connected in series relation therewith to form a first branch circuit of said network and forming a junction point therebetween, fixed capacitive reactive means in parallel with said variable inductive reactive means, variable reactive means in parallel with said fixed inductive reactive means, said variable reactive means being adjustable over a range of reactance including values of inductive and capacitive reactance, said fixed capacitive reactive means and said variable reactive means constituting a second branch circuit, means for adjusting the reactance of said variable inductive reactive means and of said variable reactive means, an input circuit connected to the extremities of said branch circuits for supplying input voltage components thereto, said voltage components when represented as vectors on a voltage diagram intersect at a fixed origin point and define therebetween an input angle for said branch circuits, an output circuit energized from said network, the voltage supplied to said output circuit being adjustable in phase displacement relative to said input voltage and to said origin point due to changes in the reactance of said variable reactive means and of said variable inductive reactive means, and a load circuit energized from said output circuit, said load and said output circuit being equivalent to an impedance interconnected between said junction point and said origin point and having a power factor angle within a range extending between one-half of said input angle lagging and one-half of said input angle leading.

2. An impedance phase shifting network comprising fixed inductive reactive means and first variable inductive reactive means connected in series relation therewith to form a first branch circuit of said network and forming a junction point therebetween, first fixed capacitive reactive means in parallel with said variable inductive reactive means, second variable inductive reactive means, second fixed capacitive reactive means in series with said second variable inductive reactive means, said second variable inductive reactive means and said second fixed capacitive reactive means being connected in parallel with said fixed inductive reactive means, said second variable reactive means being adjustable over a range of inductive reactance including values less than and greater than the value of capacitive reactance of said second fixed capacitive reactive means, said first and second fixed capacitive reactive means and said second variable reactive means constituting a second branch circuit, means for adjusting the reactance of said first and second variable inductive reactive means, an input circuit connected to the extremities of said branch circuits for supplying input voltage components thereto, said voltage components when represented as vectors on a voltage diagram intersect at a fixed origin point and define therebetween an input angle for said branch circuits, an output circuit energized from said network, the voltage supplied to said output circuit being adjustable in phase displacement relative to said input voltage and to said origin point due to changes in the reactance of said first and second variable reactive means, and a load circuit energized from said output circuit, said load and said output circuit being equivalent to an impedance interconnected between said junction point and said origin point and having a power factor angle within a range extending between one-half of said input angle lagging and one-half of said input angle leading.

3. An impedance phase shifting network comprising fixed inductive reactive means and first variable inductive reactive means connected in series relation therewith to form a first branch circuit of said network and forming a junction point therebetween, first fixed capacitive reactive means in parallel with said variable inductive reactive means, second variable inductive reactive means, second fixed capacitive reactive means having substantially the same value of reactance as said first fixed capacitive reactive means, said second fixed capacitive reactive means being connected in series with said second variable inductive reactive means, said second fixed capacitive reactive means and said second variable inductive reactive means being connected in parallel with said fixed inductive reactive means, said second variable reactive means being adjustable over a range of inductive reactance including values numerically less than and greater than the value of capacitive reactance of said second fixed capacitive reactive means, said first and second fixed capacitive reactive means and said second variable reactive means constituting a second branch circuit, means for adjusting the reactance of said first and second variable inductive reactive means, the impedance of said first variable inductive reactive means having the same relation to the component of the load current supplied by said first branch circuit as the impedance of said second variable inductive reactive means has to the component of the load current supplied by said second branch circuit, an input circuit connected to the extremities of said branch circuits for supplying input voltage components thereto, said voltage components when represented as vectors on a voltage diagram intersect at a fixed origin point and define therebetween an input angle for said branch circuits, an output circuit energized from said network, the voltage supplied to said output circuit being adjustable in phase displacement relative to said input voltage and to said origin point due to changes in the reactance of said first and second variable reactive means, and a load circuit energized from said output circuit, said load and said output circuit being equivalent to an impedance interconnected between said junction point and said origin point and having a power factor angle within a range extending between one-half of said input angle lagging and one-half of said input angle leading.

4. An impedance phase shifting network comprising fixed inductive reactive means and first variable inductive reactive means connected in series relation therewith to form a first branch circuit of said network and forming a junction point therebetween, first fixed capacitive reactive means in parallel with said variable inductive reactive means, second variable inductive reactive means, second fixed capacitive reactive means having substantially the same motive of reactance as said first fixed capacitive reactive means, said second fixed capacitive reactive means being connected in series with said second variable inductive reactive means, said second fixed capacitive reactive means and said second variable inductive reactive means being connected in parallel with said fixed inductive reactive means, said second variable reactive means being adjustable over a range of inductive reactance including values less than and greater than the value of capacitive reactance of said second fixed capacitive reactive means, said first and second fixed capacitive reactive means and said second variable reactive means constituting a second branch circuit, common means for adjusting the reactance of said first and second variable inductive reactive means, the impedance of said first variable inductive reactive means having the same relation to the component of the load current supplied by said first branch circuit as the impedance of said second variable inductive reactive means has to the component of the load current supplied by said second branch circuit, an input circuit connected to the extremities of said branch circuits for supplying input voltage components thereto, said voltage components when represented as vectors on a voltage diagram intersect at a fixed origin point and define therebetween an input angle of 120 degrees for said branch circuits, an output circuit energized from said network, the voltage supplied to said output circuit being adjustable in phase displacement relative to said input voltage due to changes in the reactance of said first and second variable reactive means, and a load circuit energized from said output circuit being equivalent to an impedance interconnected between said junction point and said origin point and having a power factor within a range extending between 60 degrees lagging and 60 degrees leading.

BURNICE D. BEDFORD.
HARRY L. KELLOGG.

No references cited.